(12) United States Patent
Lin

(10) Patent No.: US 6,689,475 B1
(45) Date of Patent: Feb. 10, 2004

(54) HEAT TREATABLE COATED ARTICLES WITH BORIDE LAYER OF TITANIUM AND/OR ZIRCONIUM AND METHODS OF MAKING SAME

(75) Inventor: Yuping Lin, West Bloomfield, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

(21) Appl. No.: 10/300,007

(22) Filed: Nov. 20, 2002

(51) Int. Cl.$^7$ .............................................. B32B 17/00
(52) U.S. Cl. ...................... 428/428; 428/432; 428/446; 428/698; 428/704
(58) Field of Search ................................ 428/426, 427, 428/428, 432, 689, 698, 446, 704; 204/192.1

(56) References Cited

U.S. PATENT DOCUMENTS

| | | | |
|---|---|---|---|
| 5,298,048 A | 3/1994 | Lingle et al. ............... 65/60.02 |
| 5,376,455 A | 12/1994 | Hartig et al. ............... 428/428 |
| 5,395,698 A | 3/1995 | Neuman et al. ............ 428/428 |
| 5,411,794 A | * 5/1995 | Kawaguchi et al. ........ 428/216 |
| 5,543,229 A | * 8/1996 | Ohsaki et al. .............. 428/432 |
| 5,552,180 A | * 9/1996 | Finley et al. ............... 427/165 |
| 5,688,585 A | 11/1997 | Lingle et al. ............... 428/216 |
| 5,837,108 A | 11/1998 | Lingle et al. .......... 204/192.15 |
| 5,939,201 A | 8/1999 | Boire et al. ................. 428/432 |
| 6,014,872 A | 1/2000 | Hartig et al. .................. 65/58 |
| 6,114,043 A | 9/2000 | Joret .......................... 428/428 |
| 6,159,607 A | 12/2000 | Hartig et al. ................ 428/426 |
| 6,466,298 B1 | 10/2002 | Fix et al. ..................... 349/195 |
| 6,558,800 B1 | 5/2003 | Stachowiak ................. 428/426 |
| 6,576,349 B2 | 6/2003 | Lingle et al. ................ 428/610 |
| 2001/0044032 A1 | * 11/2001 | Finley et al. ................ 428/433 |
| 2002/0192473 A1 | 12/2002 | Gentilhomme et al. ..... 428/432 |

FOREIGN PATENT DOCUMENTS

| | | | |
|---|---|---|---|
| JP | 63-206333 | 8/1988 | |
| JP | 64-005930 | 1/1989 | |
| JP | 05213632 A | * 8/1993 | ........... C03C/17/34 |
| WO | WO 01/21540 | 3/2001 | |
| WO | WO 02/04375 | 1/2002 | |

OTHER PUBLICATIONS

"Optical Properties of Magnetron Sputtered Boride, Oxiboride, and Nitroboride Coatings", Martin et al., 40$^{th}$ Annual Technical Conference Proceedings (1997), pp. 187–191.

"Heat Insulating Glass Which Can Be Thermally Worked", Hironobu, 05124839, Oct. 1991.

* cited by examiner

Primary Examiner—Stephen Stein
(74) Attorney, Agent, or Firm—Nixon & Vanderhye P.C.

(57) ABSTRACT

A coated article is provided with a coating or layer system that includes at least one layer including a boride of zirconium and/or titanium sandwiched between at least a pair of dielectric layers. In certain example embodiments, the coating or layer system has good corrosion resistance, good mechanical performance such as scratch resistance, and/or good color stability (i.e., a low ΔE* value(s)) upon heat treatment (HT).

16 Claims, 2 Drawing Sheets

US 6,689,475 B1

HEAT TREATABLE COATED ARTICLES WITH BORIDE LAYER OF TITANIUM AND/OR ZIRCONIUM AND METHODS OF MAKING SAME

This invention relates to coated articles that include at least one boride layer sandwiched between at least a pair of dielectric layers. In certain example embodiments, the boride layer may comprise titanium boride ($TiB_x$), zirconium boride ($ZrB_x$), and/or any other suitable boride. Such coated articles may be used in insulating glass (IG) window units, monolithic window units, vehicle windows, mirrors, and/or other suitable applications.

BACKGROUND OF THE INVENTION

Solar control coatings having a layer stack of glass/$Si_3N_4$/NiCr/$Si_3N_4$ are known in the art. Unfortunately, while such layer stacks provide efficient solar control and are overall good coatings, they sometimes are lacking in terms of: (a) corrosion resistance to acid (e.g., HCl boil); (b) mechanical performance such as scratch resistance; and/or (c) thermal stability upon heat treatment for tempering, heat bending, or the like (i.e., $\Delta E^*$ value(s)).

Accordingly, there exists a need in the art for a coated article that has improved characteristics with respect to (a), (b) and/or (c) compared to a conventional layer stack of glass/$Si_3N_4$/NiCr/$Si_3N_4$, but which still is capable of acceptable solar control (e.g., blocking a reasonable amount of IR and/or UV radiation). It is a purpose of this invention to fulfill at least one of the above-listed needs, and/or other needs which will become apparent to the skilled artisan once given the following disclosure.

SUMMARY OF THE INVENTION

In certain example embodiments of this invention, a coating or layer system is provided which includes at least one layer comprising a boride sandwiched between at least a pair of dielectric layers. The layer comprising the boride may include titanium boride ($TiB_x$) or zirconium boride ($ZrB_x$) in certain example embodiments of this invention. In certain example embodiments, the coating or layer system has good corrosion resistance to acid(s) such as HCl, good mechanical performance such as scratch resistance, and/or good color stability (i.e., a low $\Delta E^*$ value(s)) upon heat treatment (HT).

Generally speaking, certain example embodiments of this invention fulfill one or more of the above listed objects and/or needs by providing a coated article including a layer system supported by a glass substrate, the layer system comprising: a first layer comprising silicon nitride; a layer comprising at least one metal boride provided on the glass substrate over the first layer comprising silicon nitride; and a second layer comprising silicon nitride provided on the glass substrate over the layer comprising the metal boride.

In certain other example embodiments of this invention, one or more of the above-listed objects and/or needs is fulfilled by providing a coated article including a layer system supported by a glass substrate, the layer system comprising: a first layer comprising silicon nitride; a layer comprising titanium boride and/or zirconium boride provided on the glass substrate over the first layer comprising silicon nitride; and a second layer comprising silicon nitride provided on the glass substrate over the layer comprising titanium boride and/or zirconium boride.

In still other example embodiments of this invention, one or more of the above-listed objects and/or needs is/are fulfilled by providing a method of making a coated article for use in a window, the method comprising: providing a glass substrate to be used in the window; sputtering a first dielectric layer on the glass substrate; sputtering a layer comprising a metal boride on the glass substrate over the first dielectric layer; sputtering a second dielectric layer over the layer comprising the metal boride; and heat treating the coated article including the first and second dielectric layers and the layer comprising the metal boride so that as a result of the heat treating the coated article has a $\Delta E^*_G$ (glass side reflective) value of no greater than 4.0.

In still other example embodiments of this invention, one or more of the above-listed objects and/or needs is/are fulfilled by providing a coated article including a layer system supported by a glass substrate, the layer system comprising: a first layer; a layer comprising a metal boride provided on the glass substrate over the first layer; another layer provided on the glass substrate over the layer comprising the metal boride; and wherein the coated article has a $\Delta E^*_G$ (glass side reflective) value of no greater than 2.5 due to heat treatment, wherein the heat treatment is for at least about 5 minutes at a temperature(s) of at least about 580 degrees C.

IN THE DRAWINGS

DETAILED DESCRIPTION OF CERTAIN EXAMPLE EMBODIMENTS OF THE INVENTION

Certain embodiments of this invention provide a coating or layer system that may be used in windows such as monolithic windows, IG units, vehicle windows (windshields, backlites, and/or side windows), architectural windows (commercial or residential), mirrors, and/or other suitable applications. Certain example embodiments of this invention provide a layer system that is characterized by good (a) corrosion resistance to acid (e.g., which can be tested via an HCl boil); (b) mechanical performance such as scratch resistance; and/or (c) thermal stability upon heat treatment. With respect to thermal stability upon heat treatment (HT), this means a low value of $\Delta E^*$ and/or a low value of $\Delta a^*$; where $\Delta$ is indicative of change in view of HT such as thermal tempering, heat bending, or thermal heat strengthening, monolithically and/or in the context of dual pane environments such as IG units or windshields. Such heat treatments sometimes necessitate heating the coated substrate to temperatures from about 580° C. up to about 800° C. for 5 minutes or more.

Figure 1:
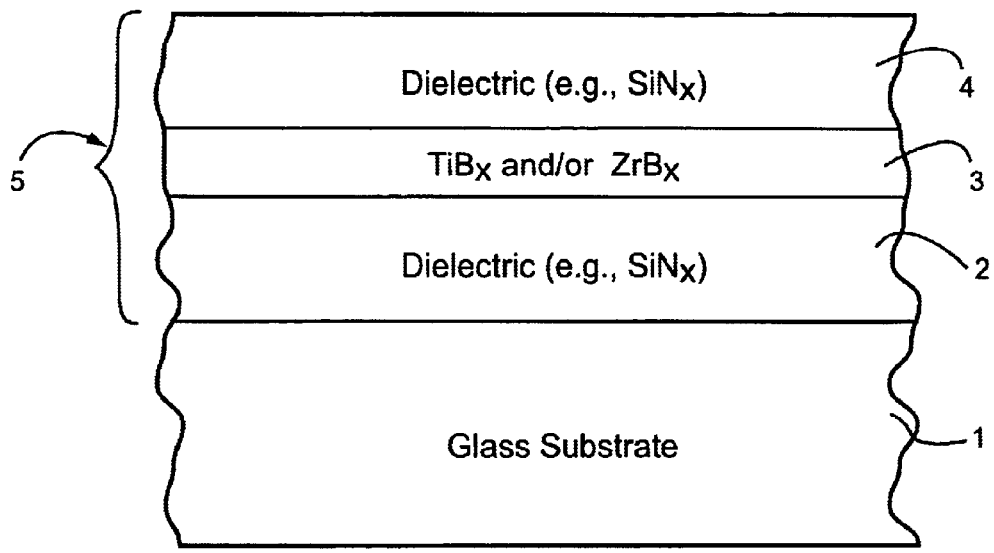
FIG. 1 is a partial cross sectional view of an embodiment of a coated article (heat treated or not heat treated) according to an example embodiment of this invention.

FIG. 1 is a side cross sectional view of a coated article according to an example embodiment of this invention. The coated article includes at least substrate 1 (e.g., clear, green, bronze, grey, blue, or blue-green glass substrate from about 1.0 to 12.0 mm thick), first dielectric layer 2 (e.g., of or including silicon nitride (e.g., $Si_3N_4$), titanium oxide, titanium nitride, silicon oxynitride, aluminum oxide, zinc oxide, titanium boron nitride ($TiBN_x$), titanium boron oxide ($TiBO_x$) or the like), IR reflecting layer 3 of or including a boride, and second dielectric layer 4 (e.g., of or including silicon nitride (e.g., $Si_3N_4$), titanium nitride, titanium oxide, silicon oxynitride, zinc oxide, aluminum nitride, $TiBN_x$, $TiBO_x$, or the like). The boride of layer 3 may be of or include titanium boride ($TiB_x$), zirconium boride ($ZrB_x$), or a mixture thereof in certain example embodiments of this invention. Overall coating 5 includes at least layers 2–4. It is noted that the terms "oxide", "boride" and "nitride" as used herein include various stoichiometries. For example, the term titanium oxide includes TiO, $TiO_2$ and various other stoichiometries $TiO_x$. In a similar manner, the terms zirconium boride and $ZrB_x$ includes both stoichiometric and non-stoichiometric borides of Zr. Thus, the phrase "zirconium boride" includes zirconium diboride as well as various other stoichiometries including a boride of Zr. As another example, the term silicon nitride includes stoichiometric $Si_3N_4$ as well as other non-stoichiometric nitrides of silicon. Layers 2–4 may be deposited on substrate 1 via magnetron sputtering, or via any other suitable technique in different embodiments of this invention.

In certain example embodiments of this invention, layer 3 comprises $TiB_x$ or $ZrB_x$, where "x" is from 1 to 3, more preferably where "x" is from 1.4 to 2.1. In other words, in certain example embodiments layer 3 may be said to comprise $TiB_x$ or $ZrB_x$, where $1.0<=x<=3.0$, more preferably $1.4<=x<=2.1$. This range of "x" is provided for purposes of example in certain embodiments of this invention.

While FIG. 1 illustrates coating 5 in a manner where $TiB_x$ or $ZrB_x$ layer 3 is in direct contact with dielectric layers 2 and 4, the instant invention is not so limited. Other layer(s) may be provided between layers 2 and 3 (and/or between layers 3 and 4) in certain other embodiments of this invention. Moreover, other layer(s) may be provided between substrate 1 and layer 2 in certain embodiments of this invention; and/or other layer(s) may be provided on substrate 1 over layer 4 in certain embodiments of this invention. Thus, while the coating 5 or layers thereof is/are "on" or "supported by" substrate 1 (directly or indirectly), other layer(s) may be provided therebetween. Thus, for example, the layer system 5 and layers thereof shown in FIG. 1 are considered "on" the substrate 1 even When other layer(s) may be provided therebetween (i.e., the terms "on" and "supported by" as used herein are not limited to directly contacting).

Surprisingly, it has been found that the use of $TiB_x$ and/or $ZrB_x$ in layer 3 (as opposed to only NiCr) results in a coated article having: (a) improved corrosion resistance with respect to acid such as HCl; (b) improved mechanical performance such as better scratch resistance; and/or (c) improved thermal stability (i.e., lower $\Delta E^*$ value(s)). Moreover, the use of $TiB_x$ and/or $ZrB_x$ enables a deeper blue color to be achieved in certain example embodiments of this invention. Improved process control may also be achieved. It has also surprisingly been found that the use of $TiB_x$ and/or $ZrB_x$ in layer 3 may improve the durability of the dielectric overcoat (e.g., silicon nitride) in certain example embodiments of this invention.

In certain example embodiments of this invention, dielectric anti-reflection layers 2 and/or 4 each may have an index of refraction less than that of metal boride inclusive layer 3 for anti-reflective purposes (e.g., layers 2 and/or 4 may have an index of refraction "n" of from about 1.9 to 2.1, while layer 3 may have an index "n" higher than that). In embodiments of this invention where layers 2 and/or 4 comprise silicon nitride (e.g., $Si_3N_4$), sputtering targets including Si employed to form these layers may or may not be admixed with up to 6–20% by weight aluminum or stainless steel (e.g. SS#316), with about this amount then appearing in the layers so formed.

Figure 2:
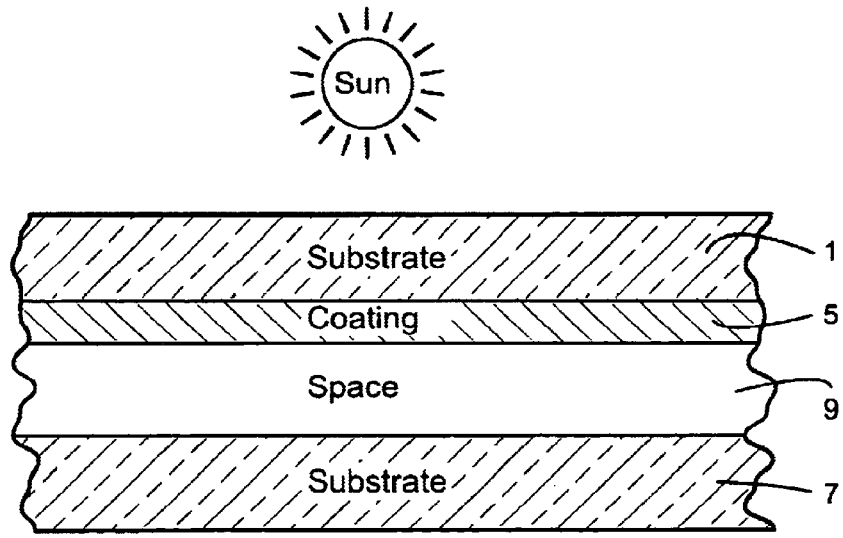
FIG. 2 is a partial cross-sectional view of an IG unit as contemplated by this invention, in which the coating or layer system of FIG. 1 may be used.

FIG. 2 illustrates the coating or layer system 5 of FIG. 1 being utilized on surface #2 of an IG (insulating glass) window unit. The two glass substrates (e.g., float glass 2 mm to 12 mm thick) 1, 7 in FIG. 2 are sealed at their peripheral edges by a conventional sealant and/or spacer (not shown) and may be provided with a conventional desiccant strip (not shown). The panes are then retained in a conventional window or door retaining frame. By sealing the peripheral edges of the glass sheets and replacing the air in insulating space (or chamber) 9 with a gas such as argon, a high insulating value IG unit is formed. Optionally, insulating space 9 may be at a pressure less than atmospheric pressure in certain alternative embodiments, although this of course is not necessary in all IG embodiments. Coating 5 from FIG. 1 may be provided on the inner wall of substrate 1 in certain embodiments of this invention (as in FIG. 2), and/or on the inner wall of substrate 7 in other embodiments of this invention.

Turning back to FIG. 1, while various thicknesses may be used consistent with one or more of the objects and/or needs discussed herein. According to certain non-limiting example embodiments of this invention, example thicknesses and materials for the respective layers on the glass substrate 1 are as follows:

TABLE 1

(Thicknesses)

| Layer | Preferred Range (Å) | More Preferred (Å) |
|---|---|---|
| silicon nitride (layer 2) | 100–900 Å | 200–800 Å |
| $TiB_x$ or $ZrB_x$ (layer 3) | 50–900 Å | 100–500 Å |
| silicon nitride (layer 4) | 100–900 Å | 150–800 Å |

In certain exemplary embodiments, the color stability with lengthy HT may result in substantial matchability between heat-treated and non-heat treated versions of the coating or layer system. In other words, in monolithic and/or IG applications, in certain embodiments of this invention two glass substrates having the same coating system thereon (one HT after deposition and the other not HT) appear to the naked human eye to look substantially the same.

The value(s) $\Delta E^*$ is important in determining whether or not there is matchability, or substantial color matchability upon HT, in the context of certain embodiments of this invention. Color herein is described by reference to the conventional $a^*$, $b^*$ values. The term $\Delta a^*$ is simply indicative of how much color value $a^*$ changes due to HT.

The term $\Delta E^*$ (and $\Delta E$) is well understood in the art and is reported, along with various techniques for determining it, in ASTM 2244-93 as well as being reported in Hunter et. al., The Measurement of Appearance, $2^{nd}$ Ed. Cptr. 9, page 162 et seq. (John Wiley & Sons, 1987). As used in the art, $\Delta E^*$ (and $\Delta E$) is a way of adequately expressing the change (or lack thereof) in reflectance and/or transmittance (and thus color appearance, as well) in an article after or due to HT. $\Delta E$ may be calculated by the "ab" technique, or by the Hunter technique (designated by employing a subscript "H"). $\Delta E$ corresponds to the Hunter Lab L, a, b scale (or $L_h$, $a_h$, $b_h$) Similarly, $\Delta E^*$ corresponds to the CIE LAB Scale $L^*$, $a^*$, $b^*$. Both are deemed useful, and equivalent for the purposes of this invention. For example, as reported in Hunter et. al. referenced above, the rectangular coordinate/scale technique (CIE LAB 1976) known as the $L^*$, $a^*$, $b^*$ scale may be used, wherein:

$L^*$ is (CIE 1976) lightness units $a^*$ is (CIE 1976) red-green units $b^*$ is (CIE 1976) yellow-blue units and the distance $\Delta E^*$ between $L^*_o$ $a^*_o$ $b^*_o$ and $L^*_1$ $a^*_1$ $b^*_1$ is:

$$\Delta E^* = \{(\Delta L^*)^2 + (\Delta a^*)^2 + (\Delta b^*)^2\}^{1/2} \qquad (1)$$

where:

$$\Delta L^* = L^*_1 - L^*_o \quad (2)$$

$$\Delta a^* = a^*_1 - a^*_o \quad (3)$$

$$\Delta b^* = b^*_1 - b^*_o \quad (4)$$

where the subscript "o" represents the coating (or coated article) before heat treatment and the subscript "1" represents the coating (coated article) after heat treatment; and the numbers employed (e.g., a*, b*, L*) are those calculated by the aforesaid (CIE LAB 1976) L*, a*, b* coordinate technique. In a similar manner, ΔE may be calculated using equation (1) by replacing a*, b*, L* with Hunter Lab values $a_h$, $b_h$, $L_h$. Also within the scope of this invention and the quantification of ΔE* are the equivalent numbers if converted to those calculated by any other technique employing the same concept of ΔE* as defined above.

In certain example non-limiting embodiments of this invention, coatings or layer systems herein provided on clear monolithic glass substrates have reflective color as follows before heat treatment, as viewed from the glass side of the coated article (Ill. C., 2 degree observer):

TABLE 2

Glass Side Reflective Color ($R_G$) Before Heat Treatment

|  | General | Preferred |
|---|---|---|
| a* | −8 to +8 | −5 to +6 |
| b* | −30 to +20 | −20 to +10 |
| L* | 10 to 75 | 25 to 60 |

After heat treatment (HT), in certain example embodiments of this invention coated articles have color characteristics as follows in Table 3. It is noted that subscript "G" stands for glass side reflective color, subscript "T" stands for transmissive color, and subscript "F" stands for film side color. As is known in the art, glass side (G) means reflective color when viewed from the glass side (as opposed to the layer/film side) of the coated article. Film side (F) means reflective color when viewed from the side of the coated article on which the coating 5 is provided.

TABLE 3

Color due to/after Heat Treatment

|  | General | Preferred | Most Preferred |
|---|---|---|---|
| ΔE*$_G$ | <=5.0 | <=2.5 | <=2.0 |
| ΔE*$_F$ | <=5.0 | <=2.5 | <=2.0 |
| ΔE*$_T$ | <=5.0 | <=2.5 | <=2.0 |
| a*$_G$ | −6 to +6 | −4 to +4 | −3 to +3 |
| b*$_G$ | −30 to +25 | −25 to +20 | −20 to +10 |
| Δa*$_G$ | <=1.6 | <=1.0 | <=0.8 |
| Δb*$_G$ | <=1.5 | <=1.0 | <=0.6 |
| ΔL*$_G$ | <=5 | <=3 | <=2 |
| $T_{vis}$ (TY): | 8–80% | 10–40% | 10–30% |
| $R_s$ (Ω/sq): | <130 | <120 | <115 |

Figure 3:
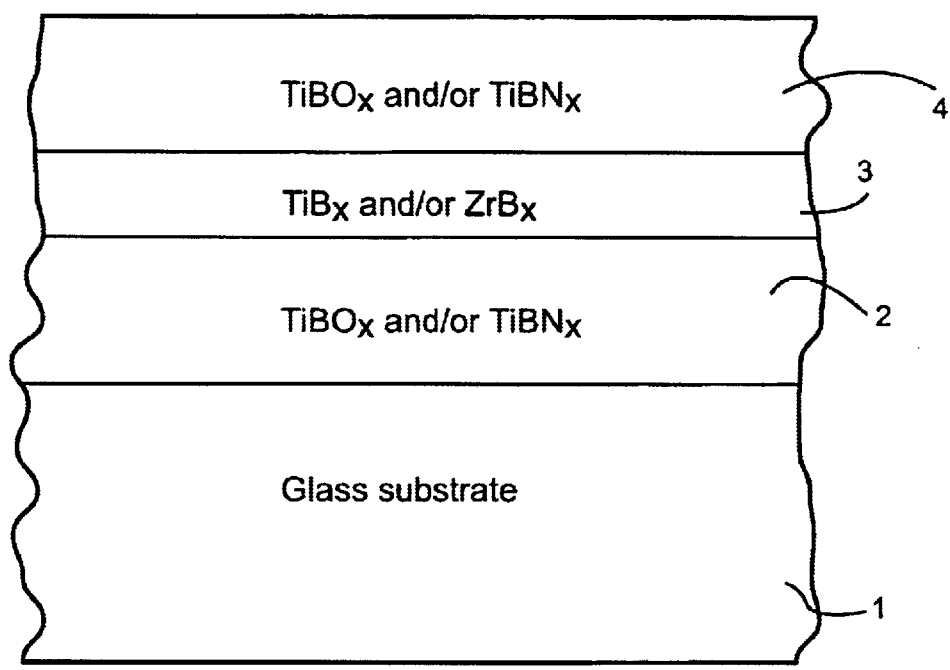
FIG. 3 is a partial cross sectional view of an embodiment of a coated article (heat treated or not heat treated) according to another embodiment of this invention.

FIG. 3 is a partial cross sectional view of a coated article according to another example embodiment of this invention. The FIG. 3 embodiment is similar to the embodiments described above, except for the materials used. In particular, one or more of the dielectric layers 2, 4 comprises a boride such as $TiBO_x$ and/or $TiBN_x$, while the IR reflecting layer 3 still is of or includes a metal boride such as $TiB_x$ and/or $ZrB_x$.

For purposes of example only, a plurality of examples representing different example embodiments of this invention are set forth below.

EXAMPLES

The following seven monolithic Example coated articles (each ultimately annealed and heat treated) were made. The $Si_3N_4$ layers in each example were deposited by sputtering a silicon target (doped with Al) in an atmosphere including nitrogen gas. The metal boride layer in each example was deposited by sputtering in an atmosphere including argon gas (e.g., 30–40 sccm Ar, 1 kW). In sputtering the metal boride layers, the boride was included in the target itself in the examples. For example, a titanium boride target was used in sputtering the titanium boride layers of Examples 1–2. The thicknesses and stoichiometries listed below for the Examples are approximations and are not exact. The coating 5 for each Example is shown in FIG. 1, and thus includes layers 2, 3 and 4. The glass substrates were clear and about 3 mm thick in each Example. The layers were deposited on the glass substrates via sputtering, and the approximate layer thicknesses and stoichiometries set forth below.

TABLE 4

Coatings in Examples

| Example 1: | Glass/$Si_3N_4$(750 Å)/$TiB_2$(200 Å)/$Si_3N_4$(250 Å) |
| Example 2: | Glass/$Si_3N_4$(750 Å)/$TiB_2$(200 Å)/$Si_3N_4$(250 Å) |
| Example 3: | Glass/$Si_3N_4$(800 Å)/$ZrB_2$(200 Å)/$Si_3N_4$(300 Å) |
| Example 4: | Glass/$Si_3N_4$(800 Å)/$ZrB_2$(200 Å)/$Si_3N_4$(300 Å) |

After being sputter coated in the manners described above, the Examples 1–4 had the following optical characteristics in annealed form (not HT) (Ill. C, 2 deg. observer):

TABLE 5

Characteristics - Annealed (non-HT)

| Parameter | Ex. 1 | Ex. 2 | Ex. 3 | Ex. 4 |
|---|---|---|---|---|
| Y (refl. %): | 18.08 | 19.32 | 16.66 | 17.74 |
| a*$_G$: | 0.84 | 0.33 | 1.48 | 1.1 |
| b*$_G$: | −17.85 | −17.32 | −19.02 | −17.55 |
| L*$_G$: | 49.59 | 51.06 | 47.84 | 49.18 |
| a*$_F$: | 0.59 | 0.72 | 2.02 | 1.53 |
| b*$_F$: | 20.08 | 20.47 | 25.05 | 24.08 |
| L*$_F$: | 64.04 | 63.97 | 55.67 | 57.94 |

Table 6 set forth below illustrates thermal stability characteristics of Examples 1–4 upon/after heat treatment (HT). The HT performed for about 10 minutes at about 625 degrees C. The Δa*, Δb* and ΔL* values are provided in terms of absolute value.

TABLE 6

Thermal Stability Upon Heat Treatment

| Parameter | Ex. 1 | Ex. 2 | Ex. 3 | Ex. 4 |
|---|---|---|---|---|
| ΔE*$_G$: | 1.96 | 2.16 | 2.10 | 1.91 |
| ΔE*$_F$: | 0.89 | 1.0 | 1.77 | 0.74 |
| ΔE*$_T$: | 1.19 | 1.24 | 1.54 | 1.66 |
| a*$_G$: | 1.58 | 1.18 | 2.27 | 1.87 |
| b*$_G$: | −17.56 | −17.18 | −18.12 | −17.09 |
| Δa*$_G$: | 0.74 | 0.85 | 0.79 | 0.77 |
| Δa*$_F$: | 0.14 | 0.18 | 0.71 | 0.43 |
| Δb*$_G$: | 0.29 | 0.14 | 0.9 | 0.46 |
| ΔL*$_G$: | 1.79 | 1.98 | 1.72 | 1.69 |

As can be seen from Table 6, all Examples were characterized by excellent ΔE* and other Δ values. The low numbers associated with these values illustrate how little the optical characteristics of the coating changed upon the heat treatment. This is indicative of superior thermal stability upon heat treatment (e.g., thermal tempering or the like). The sheet resistance ($R_s$) for all examples was from about 108 to 111 ohms/square.

For purposes of comparison, consider the following layer stack: glass/$Si_3N_4$/NiCr/$Si_3N_4$, where the underlayer of $Si_3N_4$ is about 50–70 Å (angstroms) thick, the NiCr layer is about 325 Å thick, and the overcoat of $Si_3N_4$ is about 210–310 Å thick. This comparative coated article has a rather high transmissive $\Delta E^*$ value of about 5.9 after a heat treatment (HT) at 625 degrees C for ten (10) minutes. This high transmissive $\Delta E^*$ value means that the coated article does not approximately match colorwise non-heat-treated counterpart versions with regard to transmissive color after 10 minutes of HT. In contrast, it can be seen that Examples 1–4 have better color stability upon HT (i.e., lower $\Delta E^*$) than this comparative layer stack of glass/$Si_3N_4$/NiCr/$Si_3N_4$. This example advantage of using $TiB_x$ or $ZrB_x$ is clear in view of the above.

Tables 7a and 7b set forth below illustrates the good chemical durability of Examples 1–4 (after HT). Each example coating was exposed to 1 hour of HCl acid boil, and also to 1 hour of NaOH boil. The $\Delta C$ values in Tables 7a and 7b are indicative of the change in $a^*$, $b^*$, and $L^*$ parameters caused by the respective boils. In particular, the $\Delta C$ values were determined in the same manner as the $\Delta E^*$ values defined above (see equations (1)–(4)), except that in equations (2)–(4) the subscript "o" represents the coating (or coated article) before the boil and the subscript "1" represents the coating (or coated article) after the boil.

TABLE 7a

Chemical Durability (HCl 1 hr. boil)

| Parameter | Ex. 2 | Ex. 4 |
|---|---|---|
| $\Delta C_G$: | 0.36 | 0.33 |
| $\Delta C_F$: | 1.14 | 1.48 |
| $\Delta C_T$: | 0.07 | 0.30 |

TABLE 7b

Chemical Durability (NaOH 1 hr. boil)

| Parameter | Ex. 1 | Ex. 3 |
|---|---|---|
| $\Delta C_G$: | 1.05 | 1.46 |
| $\Delta C_F$: | 4.7 | 5.10 |
| $\Delta C_T$: | 1.11 | 1.80 |

It can be seen from Tables 7a and 7b above that Examples 1–4 realized good chemical durability upon exposure to HCl acid treatment (HCl boil for one hour) and NaOH treatment (Examples 2 and 4 were subject to the HCl boil and Examples 1 and 3 were subject to the NaOH boil). In certain example embodiments of this invention, coated articles are chemically durable in that they have a $\Delta C_G$ value (upon 1 hr. HCl and/or NaOH boil) of no greater than 4.0, more preferably of no greater than 3.0, and most preferably no greater than 2.0, and sometimes no greater than 1.5 or even 1.0. The $\Delta C_F$ value for the NaOH boil is largely controlled by silicon nitride etching. This value is typically at least 10 for coatings where NiCr is used (see the comparative example); and the much better (i.e., lower) value herein illustrates that the use of a metal boride instead of NiCr surprisingly enables a silicon nitride overcoat of improved quality.

Accordingly, advantages associated with the use of metal borides such as borides of Zr and/or Ti in a solar control coating include (a) improved corrosion resistance with respect to acid such as HCl; (b) improved mechanical performance such as better scratch resistance; and/or (c) improved thermal stability (i.e., lower $\Delta E^*$ value(s)). In certain embodiments of this invention, coated articles may or may not be heat treated.

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB $a^*$, $b^*$ coordinates and scale (i.e. the CIE $a^*b^*$ diagram, Ill. CIE-C, 2 degree observer). Other similar coordinates may be equivalently used such as by the subscript "h" to signify the conventional use of the Hunter Lab Scale, or Ill. CIE-C, $10°$ observer, or the CIE LUV $u^*v^*$ coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by 10 Using the CIE System" and/or as reported in IES LIGHTING HANDBOOK 1981 Reference Volume.

The terms "emittance" and "transmittance" are well understood in the art and are used herein according to their well known meaning. Thus, for example, the term "transmittance" means solar transmittance, which is made up of visible light transmittance (TY), infrared radiation transmittance, and ultraviolet radiation transmittance. Total solar energy transmittance (TS) is then usually characterized as a weighted average of these other values. With respect to these transmittances, visible transmittance (TY), as reported herein, is characterized by the standard CIE Illuminant C, 2 degree observer, technique at 380–720 nm; near-infrared is 720–2500 nm; ultraviolet is 300–800 nm; and total solar is 300–2500 nm. For purposes of emittance, however, a particular infrared range (i.e. 2,500–40,000 nm) is employed.

Visible transmittance can be measured using known, conventional techniques. For example, by using a spectrophotometer, such as a Perkin Elmer Lambda 900 or Hitachi U4001, a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus system, ASTM E-308-85) uses the Ill. C., 2 degree observer.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer or layer system is reflecting infrared energy, and is thus often used along with emittance as a measure of this characteristic. "Sheet resistance" may for example be conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". For example, chemical durability may be determined by boiling a sample of a coated glass substrate in about 500 cc of 5% HCl for one hour (i.e. at about 195° F.). This is what is meant by HCl boil herein. Alternatively, chemical durability may be determined by an NaOH boil which includes boiling a sample of a coated glass substrate in a solution having a pH of about 12.2 that is a mixture of water and NaOH (about 0.4% NaOH); the solution is available from LabChem, Inc., Cat. No. LC 24270-4 (this is what is meant by NaOH boil herein). The NaOH boil may be carried out at a temperature of about 145 degrees F (Examples above), or about 195 degrees F in other instances.

The terms "heat treatment" and "heat treating" as used herein mean heating the article to a temperature sufficient to enabling thermal tempering, bending, or heat strengthening of the glass inclusive article. This definition includes, for example, heating a coated article to a temperature of at least about 580 degrees C for a sufficient period to enable tempering. In some instances, the HT may be for at least about 4 or 5 minutes.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A coated article including a layer system supported by a glass substrate, the layer system comprising:
   a first layer comprising silicon nitride;
   a layer comprising titanium boride and/or zirconium boride provided on the glass substrate over the first layer comprising silicon nitride;
   a second layer comprising silicon nitride provided on the glass substrate over the layer comprising titanium boride and/or zirconium boride; and
   wherein at least one of the layers comprising silicon nitride further includes at least one of stainless steel, aluminum, and oxygen.

2. A coated article including a layer system supported by a glass substrate, the layer system comprising:
   a first layer comprising silicon nitride;
   a layer comprising titanium boride and/or zirconium boride provided on the glass substrate over the first layer comprising silicon nitride;
   a second layer comprising silicon nitride provided on the glass substrate over the layer comprising titanium boride and/or zirconium boride; and
   wherein the layer comprising titanium boride and/or zirconium boride is in direct contact with each of the first and second layers comprising silicon nitride.

3. The coated article of claim 1, wherein the coated article is not heat treated.

4. The coated article of claim 1, wherein the coated article is heat treated and has a $\Delta E^*_G$ (glass side reflective) value of no greater than 5.0 due to heat treatment, wherein the heat treatment is for at least about 5 minutes at a temperature(s) of at least about 580 degrees C.

5. The coated article of claim 1, wherein the coated article is heat treated and has a $\Delta E^*_G$ (glass side reflective) value of no greater than 2.5 due to heat treatment.

6. The coated article of claim 1, wherein the coated article is heat treated and has a $\Delta E^*_G$ (glass side reflective) value of no greater than 2.0 due to heat treatment, wherein the heat treatment is for at least about 5 minutes at a temperature(s) of at least about 580 degrees C.

7. The coated article of claim 1, wherein the coated article is chemically durable in that it is characterized by a $\Delta C_G$ (glass side reflective) value of no greater than 3.0 if exposed to a boil comprising HCl for one hour.

8. The coated article of claim 1, wherein the coated article is chemically durable in that it is characterized by a $\Delta C_G$ (glass side reflective) value of no greater than 2.0 if exposed to a boil comprising HCl for one hour.

9. The coated article of claim 1, wherein the coated article has a visible transmission of from about 10–40%.

10. The coated article of claim 1, wherein the layer system consists essentially of the first and second layers and the layer comprising titanium boride and/or zirconium boride.

11. The coated article of claim 1, wherein the layer comprising titanium boride and/or zirconium boride comprises zirconium boride.

12. The coated article of claim 1, wherein the layer comprising titanium boride and/or zirconium boride comprises titanium boride.

13. The coated article of claim 1, wherein the coated article comprises an IG window unit.

14. A coated article including a layer system supported by a glass substrate, the layer system comprising:
    a first layer;
    a layer comprising a metal boride provided on the glass substrate over the first layer; and
    a second layer provided on the glass substrate over the layer comprising the metal boride;
    wherein at least one of the first and second layers comprises titanium boron oxide and/or nitride; and
    wherein each of the first and second layers comprise titanium boron oxide.

15. The coated article of claim 14, wherein the metal boride comprises titanium boride and/or zirconium boride.

16. A coated article including a layer system supported by a glass substrate, the layer system comprising:
    a first layer;
    a layer comprising a metal boride provided on the glass substrate over the first layer; and
    a second layer provided on the glass substrate over the layer comprising the metal boride;
    wherein at least one of the first and second layers comprises titanium boron oxide and/or nitride; and
    wherein each of the first and second layers comprises at least one of $TiBO_x$ and $TiBN_x$.

* * * * *